No. 687,604. Patented Nov. 26, 1901.
W. D. CORNELIUS & F. L. TODD.
PHOTOGRAPHIC VIGNETTER.
(Application filed Apr. 13, 1901.)
(No Model.)
Fig. 1.
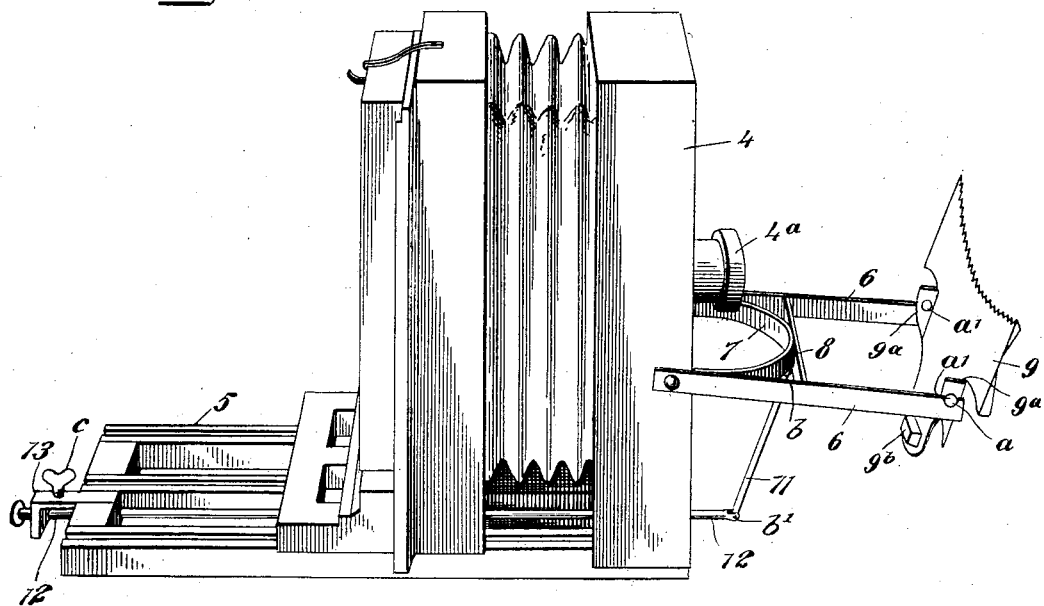
Fig. 2.
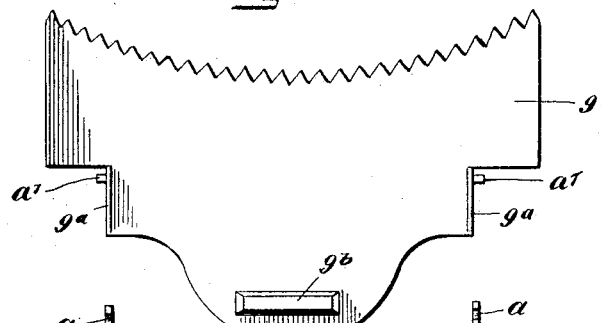
Fig. 3.
WITNESSES:
James P. Duhamel
Wm. P. Patton
INVENTORS
William D. Cornelius
Frank L. Todd
BY
ATTORNEYS

UNITED STATES PATENT OFFICE.

WILLIAM D. CORNELIUS AND FRANK L. TODD, OF ENID, OKLAHOMA TERRITORY.

PHOTOGRAPHIC VIGNETTER.

SPECIFICATION forming part of Letters Patent No. 687,604, dated November 26, 1901.

Application filed April 13, 1901. Serial No. 55,654. (No model.)

*To all whom it may concern:*

Be it known that we, WILLIAM D. CORNELIUS and FRANK L. TODD, citizens of the United States, and residents of Enid, in the county of Garfield and Territory of Oklahoma, have invented a new and Improved Photographic Vignetter, of which the following is a full, clear, and exact description.

The object of our invention is to provide a vignette attachment to a camera which is of novel simple construction, is adjustable relatively to the position of the film or plate held in the camera, so as to terminate the image or picture of a vignetted photograph at any desired point, and which is readily removable from the front of the camera when not in service.

The invention consists in the novel construction and combination of parts, as is hereinafter described, and defined in the appended claim.

Reference is to be had to the accompanying drawings, forming a part of this specification, in which similar characters of reference indicate corresponding parts in all the figures.

Figure 1 is a perspective view of a camera and of the invention thereon. Fig. 2 is an enlarged plan view of the vignette-plate, and Fig. 3 is an enlarged plan view of the supporting-frame for the vignette-plate.

In the drawings, 4 indicates a photographer's camera of ordinary construction, and 5 the supporting frame or bed whereon the camera is held to slide, as usual.

Upon the front box-section of the camera 4 the ends of two similar carrier-bars 6 are oppositely pivoted, and said bars are held in the same plane by the intermediate braces 7 and 8, the brace 7 being arched and the other brace 8 straight, the ends of the braces having secured engagement with the inner sides of the carrier-bars, as best shown in Fig. 3.

The carrier-bars 6 are positioned a suitable distance below the lens-tube $4^a$ of the camera and project outwardly therefrom to a proper length. In the top edges of the outer ends of the carrier-bars 6 notches $a$ are formed, as indicated in Fig. 3.

The vignette or cut-off plate 9, which may be of any suitable material, is mainly flat, the upper portion thereof being wider than the lower part and may have its side edges parallel, as shown, or be otherwise shaped, as may be preferred.

The upper edge of the vignette or cut-off plate 9 is concaved a proper degree and may be serrated at the edge, as shown in the drawings, for artistic effect in service as a portrait-terminator in a vignetted portrait taken in the camera.

Below the widened upper portion of the vignette or cut-off plate 9 two flanges $9^a$ are formed oppositely on the side edges of the reduced portion of said plate, and from said flanges journal-studs $a'$ project in axial alinement with each other.

The journal-studs $a'$ are designed to seat in the notches $a$, and thus support the vignette or cut-off plate 9 upon the outer ends of the carrier-bars 6, disposing the lower portion of the said plate between and below the carrier-bars, as shown in Fig. 1.

A weight-block $9^b$ or its equivalent is secured upon the lower part of the vignette or cut-off plate 9 and will serve to hold said plate vertical without regard to the position given to the carrier-bars 6.

Upon the braces 7 and 8, which may be joined together at their transverse centers, one end of an upright elevating-bar 11 is pivoted, as at $b$, the lower end thereof having pivotal connection with the forward end of the adjusting-rod 12, as shown at $b'$ in Fig. 1.

Upon the supporting-frame 5 a bracket-arm 13 is secured at the rear end thereof and is adapted to permit the adjusting-rod 12 to slide therethrough, a set-screw $c$, that screws down through the bracket-arm for engagement with the rod 12, affording means to hold the latter at a desired point of slidable adjustment.

In operation after the camera has been adjusted to properly position the image of the upper portion of the person to be photographed upon the film or plate the artist can quickly adjust the improved vignette device by a longitudinal movement of the rod 12, which will work the carrier-bars 6 up or down at their outer ends, as may be required, to properly position the concave upper edge of the vignette or cut-off plate 9 with regard to the effect it is to produce when a picture is imaged on an exposed film or plate held in the camera.

Having thus fully described our invention, we claim as new and desire to secure by Letters Patent—

The combination with a camera, a frame comprising two spaced and braced carrier-bars pivoted by opposite ends on the sides of the camera so as to rock in front thereof, an adjusting-rod slidable on the supporting-bed of the camera, through a bracket-arm, a set-screw carried by the arm and bearing upon the rod to secure it when adjusted, and an elevating-bar pivoted by its lower end upon the forward end of the adjusting-rod and jointed at its upper end upon the rockable frame, of a vignette-plate scalloped on the upper edge, two journal-studs oppositely projected from the side edges of the vignette-plate and held to rock on the outer ends of the carrier-bars, and a weight-block on the lower portion of the vignette-plate adapted to rock said plate into a vertical plane.

In testimony whereof we have signed our names to this specification in the presence of two subscribing witnesses.

WILLIAM D. CORNELIUS.
FRANK L. TODD.

Witnesses as to signature of William D. Cornelius:
  J. R. PARKS,
  C. W. ALLRED.

Witnesses as to signature of Frank L. Todd:
  THOMAS O. HASS,
  FRED. W. STEVENS.